May 1, 1956 R. C. RUSSELL 2,743,713
VALVE GEAR MECHANISM
Filed March 11, 1953 2 Sheets-Sheet 1
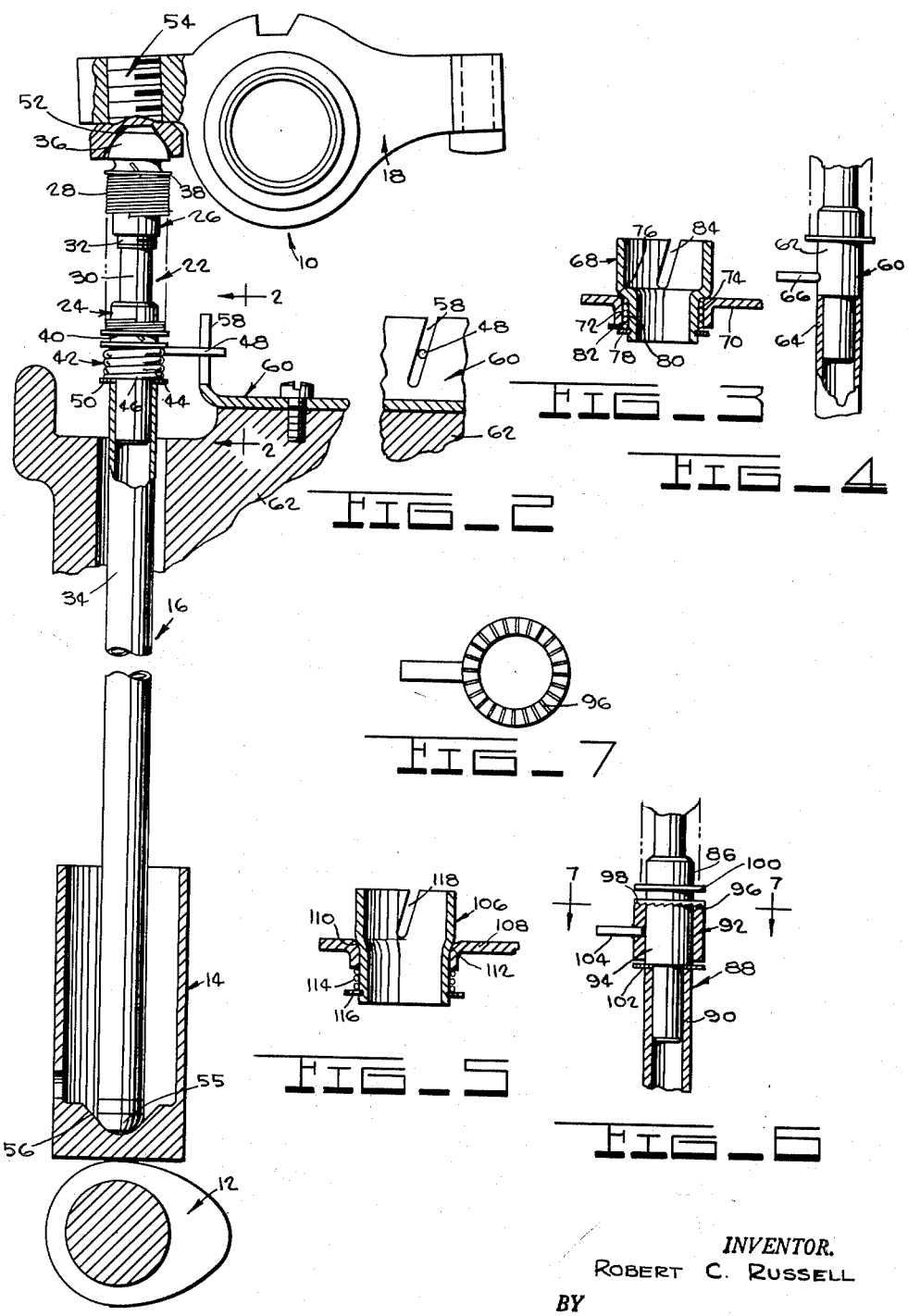
INVENTOR.
ROBERT C. RUSSELL
BY
McDonald & Feagro
ATTORNEYS

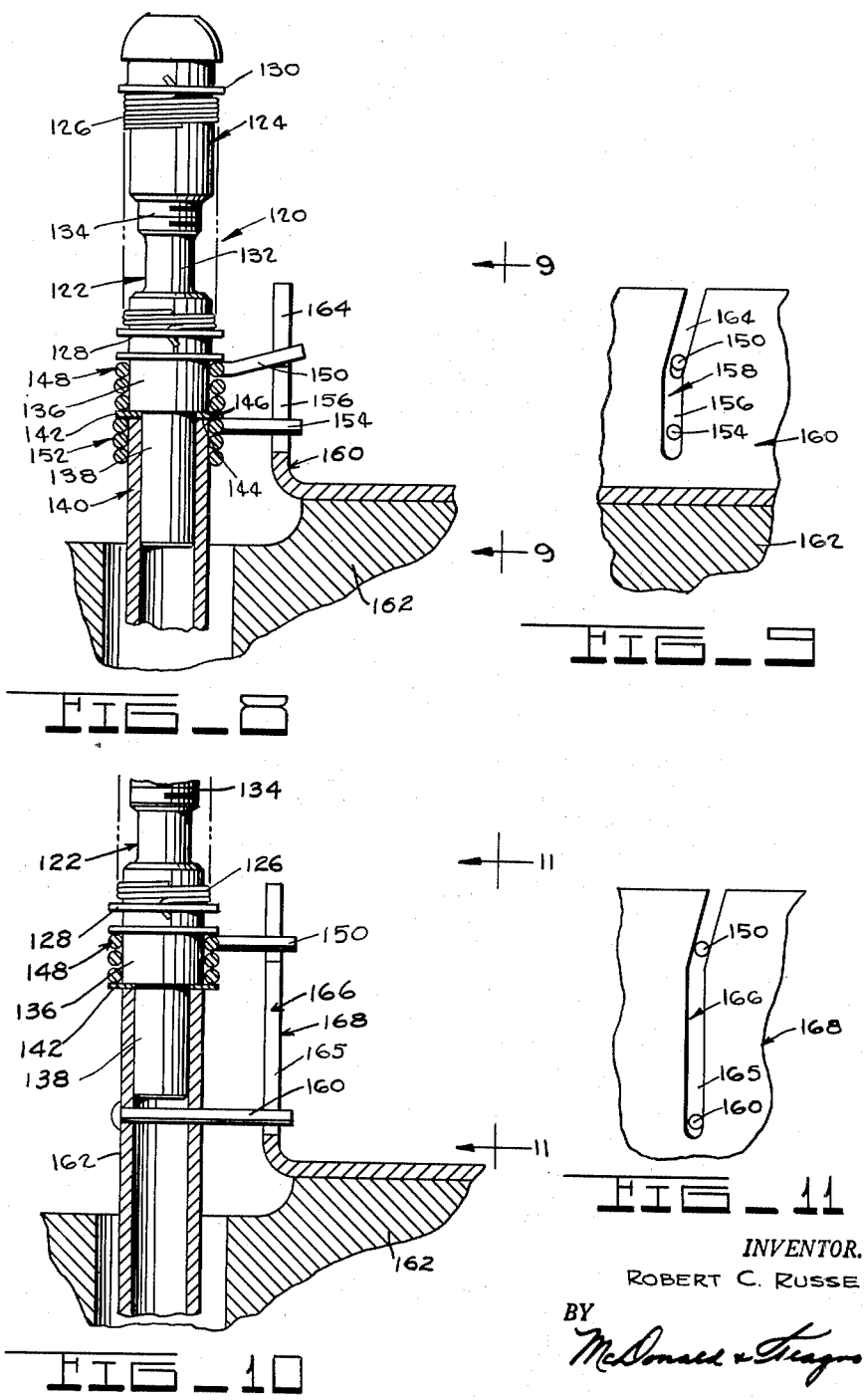

United States Patent Office 2,743,713
Patented May 1, 1956

2,743,713

VALVE GEAR MECHANISM

Robert C. Russell, South Euclid, Ohio, assignor to Eaton Manufacturing Company, Cleveland, Ohio, a corporation of Ohio Application March 11, 1953, Serial No. 341,650

20 Claims. (Cl. 123—90)

This invention relates to valve operating mechanism for internal combustion engines and the like and more particularly to means for automatically compensating for variations in length of the operating components of said mechanism.

The necessity for accomplishing an automatic compensation of length adjustment in the cooperative operating elements of an internal combustion engine valve operating mechanism has been recognized for a great length of time with the result that numerous means both hydraulic and mechanical have been devised. While it is acknowledged that some of these means have been adopted with reasonable success, problems have remained existent which require improvements so as to virtually eliminate them. Whereas hydraulic means have been plagued with problems such as dirt, temperature and varnish build up requiring servicing thereof, mechanical means devised to date have had shortcomings of one degree or another, such as adaptation to existing engines, cost of installation, servicing problems and the like whereby they have not been deemed universally acceptable. The presently devised mechanical adjusting means aside from avoiding the problems present in the hydraulic means appears to solve the present known shortcomings of previous mechanical means such that it can with slight modifications or additions to present day internal combustion engines be universally adaptable thereto.

Broadly the invention comprehends the provision of a valve operating mechanism for internal combustion engines comprising the related components thereof viz. cam, tappet, push rod, rocker arm and valve having automatic mechanical length adjusting means in the form of a torsion spring tensioned screw and nut member assembly incorporated therein and wherein one of said members is turned or partially positively rotated solely in one direction a predetermined amount for each reciprocable stroke of mechanism and the other member is restrained from rotation in one direction but free to rotate in an opposite direction.

Among the principal objects of the invention is the provision of an automatic mechanical length adjusting means or device for the valve operating mechanism of internal combustion engines, that:

a. Is economical in construction and readily and easily adaptable to present day internal combustion engines;

b. Provides for an automatic adjustment of the valve operating mechanism under all normal conditions of operation thereof such as relates to speed, wear, temperature, contamination, expansion and contraction and etc.;

c. Is not influenced by rotation of a tappet forming a component element of the valve operating mechanism;

d. Incorporates a screw and nut member assembly normally biased apart by a torsion spring, means for positively partially rotating or turning one of the members a predetermined amount in solely one direction for each cycle of operation of the mechanism;

e. Incorporates a screw and nut member assembly normally biased apart by a torsion spring, means for positively turning one of the members a predetermined amount in one direction for each cycle of operation of the mechanism, and said other member being frictionally restrained from rotation during a movement of the member being positively turned;

f. Incorporates the adjusting means in a push rod structure forming a part of the mechanism including a screw member, a nut member engageable therewith and normally biased apart therefrom by a torsion spring, means for positively turning one of the members in solely one direction, said member which is positively turned having frictional engagement with a tappet constituting another element of the mechanism and the member not positively turned having frictional engagement with a rocker arm constituting another part of the mechanism;

g. Provides for a positive predetermined lift loss for each and every cycle of operation of the valve operating mechanism;

h. Permits the use of conventionally employed tappets and cams;

i. Permits positive rotation of the push rod or at least the portion thereof engageable with a rocker arm element of a conventional valve operating mechanism and thus prevents egg shape wear on the end of the push rod engageable with the rocker arm and also an eccentric wear pattern on the engageable threaded members of the mechanism; and j. Incorporates a screw and nut member assembly normally biased apart by a torsion spring, means for positively turning one of the members in solely one direction, a third member freely relatively rotatably engageable with the member which is positively turned, and means restraining the third member from rotation, said member of the assembly not positively rotated having frictional engagement with a rocker arm constituting an element of the mechanism and said third member having frictional engagement with a tappet constituting another element of the mechanism.

Other objects and advantages of the invention will appear from the following description taken in connection with the drawings forming a part of the specification, and in which:

Fig. 1 is a partly elevational, partly cross-sectional view of a valve operating mechanism embodying the invention;

Fig. 2 is a cross-sectional view taken substantially along lines 2—2 of Fig. 1;

Figs. 3 and 4 are partly fragmentary, partly cross-sectional views of a modified form of rotating means for the adjustment means of Fig. 1;

Figs. 5 and 6 are partly fragmentary, partly cross-sectional views of a further modified form of rotating means for the adjusting means of Fig. 1;

Fig. 7 is a cross-sectional view taken substantially along lines 7—7 of Fig. 6;

Fig. 8 is a partly fragmentary, partly cross-sectional view of a modified form of adjusting means from that of Fig. 1;

Fig. 9 is a view taken substantially along lines 9—9 of Fig. 8;

Fig. 10 is a partly fragmentary, partly cross-sectional view of a modified form of adjusting means from that of Figs. 8 and 9; and Fig. 11 is a view taken substantially along lines 11—11 of Fig. 10.

In so devising the present mechanical automatic compensating length adjusting means for valve operating mechanisms for internal combustion engines, it was considered foremost to provide means which would not only virtually eliminate the shortcomings of previously devised adjusting means but which could simply and easily be universally adaptable to present day interal combustion engines.

Through the utilization of the basic structure of other mechanical adjusting means devised by others as well as by myself, that is, a threadingly engaged nut and screw member assembly biased apart by a torsion spring together with innovations of structure for the proper controlled shortening or lengthening of said assembly, I have obtained an adjusting means superior to those previously devised or manufactured.

Through the controlled positive turning or partial rotation of one of the threaded members of the assembly in only one direction to shorten the assembly a positive lift loss is introduced into the valve operating mechanism for each and every cycle of the mechanism. The turning or partial rotation is preferably provided during the closing cycle of the valve operating mechanism because of the reduced load on the mechanism as compared to the opening cycle although operation on the opening cycle is possible. As the one member of the assembly is being positively rotated in a direction to shorten the assembly the other member is restrained from rotation so that a shortening of the assembly is assured. The shortening of the assembly is of an amount sufficient to account for any lengthening of the mechanism that might occur due to expansion or the like of any of the component elements of the mechanism tending to a condition which would prevent proper seating of the valve. When the valve operating mechanism is returned to a base circle operating portion of the cam wherein the cam is ineffective to actuate the mechanism the torsion spring operates to lengthen the assembly to take up any clearance present in the mechanism.

Under conditions where a tappet constituting an element of a valve operating mechanism is rotated through interengagement of a cam of the mechanism with the tappet it is essentially necessary that the member of the assembly to be rotated is not influenced by the tappet rotation. As a means of positively preventing any such influence the member of the assembly which is positively rotated is separated from direct engagement with the tappet by a member having frictional engagement with both the rotated member and the tappet and which member is restricted to solely axial movement. Any of various structures such as hereinafter defined can be utilized to provide unidirectional rotation of one member of the assembly and also to prevent any influence of the member so rotated by reason of tappet rotation.

Referring to the drawings for more specific details of the invention 10 represents generally a valve operating mechanism comprising as component members thereof a cam 12, a tappet 14, a push rod assembly 16, and a rocker arm 18, adapted to be engaged by a valve, not shown.

The valve operating mechanism as will be noted from Fig. 1 is in a state of rest wherein the cam has just moved to its base circle position and wherein the valve would be seated by its spring, not shown. Through the provision of automatic length compensating mechanism 22 incorporated in the push rod assembly 16, the component members of the valve operating mechanism are maintained in series engagement relation for all positions of rest and operation thereof.

The push rod assembly 16 includes a preferably slender screw element 24, a nut element 26 and a torsion spring 28. The screw element includes a member 30 having an externally threaded portion 32 and an opposite axially extended tubular member 34 in which an unthreaded end portion of member 30 is secured. Nut element 26 is threadingly engageable upon the threaded portion of the screw element and terminates at one end in a spherical shape 36, the purpose of which will hereinafter appear.

Appropriate annular flanges 38 and 40 are provided respectively on the nut and screw elements and the torsion spring 28 is arranged in telescoping relation to the threaded portions of the screw and nut elements with the opposite ends thereof fixed respectively to the flanges 38 and 40 of the respective nut and screw elements serving to effectively normally bias the nut and screw elements apart to the extent of its torsionally operative length.

A coiled spring member 42 is arranged telescopically about a cylindrical portion 44 of member 30 terminating at one end in a coil 46 encircling cylindrical portion 44 and at its opposite end in a radially extended part 48, the purpose of which will hereinafter appear. Member 42 is confined axially on cylindrical portion 44 of member 30 by flange 40 on one axial extremity adjacent part 48 and on its opposite axial extremity adjacent coil 46 by a flat washer 50 slipped on member 30 and arranged axially between the end of tubular member 34 and the cylindrical portion 44 of member 30.

Coiled spring member 42 is coiled right hand and engages the cylindrical surface of portion 44 of member 30 with slight frictional pressure such that rotational movement or turning of part 48 of the spring member 42 in a clockwise direction serves to contract the coils of member 42 about the cylindrical surface of portion 44 with a resultant clutching of the parts effective to cause the screw to rotate or turn with the spring member 42. A reverse movement of portion 44 of member 30 serves to expand the coils of member 42 and release them from frictional holding position on portion 44 of member 30 thus operating to release the member 42 from member 30 permitting of the free movement of spring member 42 in a counter-clockwise direction relative to member 30. Because of the relationship of the spring member 42 to member 30, the member 30 is free to move clockwise relative to the spring member but is restrained from moving counter-clockwise relative to the spring member.

Rocker arm 18 has a conical socket 52 screw 54 securely threaded in one end thereof with the spherical shaped end 36 of the nut element 26 received in socket 52 in annular frictional engaging relation, the purpose of which will hereinafter appear.

The free end of tubular member 34 of screw element 24 has a solid element or plug 55 fixedly secured therein, said plug 55 having a spherical shape adapted to have bearing engagement in a conical cavity or socket 56 formed internally of the tappet 14. The surface of frictional engagement between the tappet and plug 55 is preferably of a low value so that any tendency for rotation of the tappet, as induced by engagement of cam 12 therewith, is not transmitted to the screw element 24 tending toward the false adjustment of the push rod assembly 16.

Radially extended part 48 of coiled spring member 42 is received in a slot 58 disposed angularly to the vertical path of movement of tappet 14, and push rod assembly 16, and arranged in a sheet metal flanged member 60 fixedly secured to an engine block 62 or other suitable stationary element. The slot 58 is of predetermined angularity of say between 6° and 10° such that with, for example, a low thread angle, on the order of 5/16–18 right hand thread on the screw and nut elements, a lift loss on the order of .0015 to .003" can be introduced into the valve operating mechanism for each cycle of valve gear operation. Slot 58 extends as shown by Fig. 2 in a direction such that when taken with the right hand coiled spring member 42, and a right hand threaded relation between the nut and screw elements, the part 48 of the spring member engages the walls adjoining the slot 58 effective upon a closing cycle of a valve operation to rotate the part 48 clockwise. This clockwise rotation of the part 48 induces a clutching action between spring member 42 and member 30 serving to rotate the screw element. Because of the friction provided between the spherical surface of the nut element and the conical surface of screw element 24 of the push rod and in view of the linear loading of the elements of the valve operating mechanism by the valve spring during this phase of operation the nut element is restrained from rotation resulting in a relative rotation of the screw and nut elements in a direction to shorten the push rod assembly and thus introduce lift loss of a predetermined value into the valve operating mechanism. By so introducing the lift loss during the cycle of operation of an amount to compensate for expansion or the like of the component elements of the valve operating mechanism, tending toward elongation thereof, an assured seating of the valve is had upon movement of the cam to its base circle position. With the load of the valve spring removed from the valve and the other components of the valve operating mechanism in series therewith and with say the lift loss operation of the push rod assembly existing in the mechanism, the torsion spring 28 will operate to thread the nut element relatively apart from the screw element in an extension operation of the push rod to take up any clearance in the mechanism and thus once again provide zero clearance.

It will be noted that upon base circle rotation of cam 12 no longitudinal movement of the push rod assembly will occur such that the spring member 42 is not rotated in either direction, thus screw element 24 is restrained from counter-clockwise rotation and the elongation of the push rod assembly requires the rotation of the nut element under the influence of torsion spring 28. Since the valve spring does not impress any load between the engageable surfaces of rocker arm 18, screw element 24 and nut element 26 a relative rotation can occur therebetween. Through this assurance of relative rotation between the nut element and the rocker arm the engageable end of the nut element has wear more evenly distributed thereover so that the pivotal action of the rocker arm as it engages the nut element will not cause egg shape wear thereof.

Inasmuch as the coiled spring member 42 is so wound upon member 30 which together with the angularity of slot 58 provides for the clutching of member 42 to member 30 during a valve closing cycle, the spring member 42 is rotated relative to member 30 on a valve opening cycle due to the movement of the member 42 counterclockwise. During this counter-clockwise movement the coils of member 42 are expanded and thus moved out of friction holding engagement upon member 30 whereby no clutching action occurs therebetween.

Figs. 3 and 4 illustrate a modified structure for accomplishing a like result as the structure of Figs. 1 and 2, wherein a screw element 60 of a push rod assembly includes a member 62 adapted to have the threaded portion thereon and a tubular member 64 in which the member 62 is fixedly secured. A pin 66 is fixedly secured to and projects radially outwardly from the member 62. A sleeve 68 of stepped configuration is supported for rotative movement in a stationary member 70 having an inner cylindrical surface 72 radially spaced a predetermined amount from an external cylindrical surface 74 on the reduced portion of the sleeve. A shoulder 76 formed externally of sleeve 68 serves to support the sleeve on member 70 whereas a snap ring 78 fitted on the outer periphery of the sleeve restrains the sleeve from axial movement out of the member 70. A coiled spring member 80 is fitted annularly between the cylindrical surfaces 72 and 74 of the sleeve 68 and axially between shoulder 76 and snap ring 78 and is so wound therebetween with one radially directed end 82 fixedly secured in the member 70 and its coiled portion frictionally embracing the sleeve effective to restrain the sleeve from rotation in one direction while permitting free rotation of the sleeve in the opposite direction. As shown in Fig. 3 with spring member 80 wound left-handed and with a slot 84 provided in sleeve 68 of such angularity as shown by Fig. 3, the pin 66 is so engageable with the sleeve in slot 84 effective upon a downward movement thereof, corresponding to a valve closing cycle, to move or rotate the screw element 60 clockwise. During this operation the tendency for the pin 66 to rotate the sleeve clockwise is resisted by the action of the spring member 80 offering a braking resistance thereto. With the provision of a screw-nut assembly of the related thread hand as provided in the structure of Fig. 1, a shortening adjustment is attained. Upon upward movement of the screw element 60 the pin 66 engages a wall of sleeve 68 adjacent the slot 84 and in so doing operates to rotate the sleeve whereupon the sleeve is free to rotate counter-lockwise as it acts to expand the spring member 80 through counter-lockwise movement relative thereto.

Figs. 5, 6 and 7 illustrate a further modified structure for effecting a like result as the structures of Figs. 1 and 2, Figs. 3 and 4. A screw element 86 of a push rod assembly includes a member 88 adapted to have a threaded portion therein and a tubular member 90 in which the member 88 is fixedly secured. A sleeve member 92 is loosely telescoped over a cylindrical portion 94 of the member 88 and has one way ratchet teeth 96 on one axial end thereof adapted to be lockingly engageable for one direction of relative rotation with complementary ratchet teeth 98 formed on an axial surface of a flange 100 formed as a part of member 88. A flat washer 102 is arranged between cylindrical portion 94 of member 88 and one axial extremity of tubular member 90 and is spaced axially a predetermined distance from the axial extremity of sleeve 92 when the sleeve is locked to the member 88. The aforesaid axial distance is of a sufficient amount to permit the release of the ratchet teeth 96 and 98 from one another. A radially outwardly extending pin 104 is secured to the sleeve 92, the purpose of which will hereinafter appear.

A sleeve 106 having a stepped configuration is supported on a stationary member 108 with a conical shoulder 110 of approximately 10° on the exterior surface of the sleeve intermediate the stepped portions of the sleeve bearing upon a complementary conical annular surface 112 of the member 108. A coil spring 114 arranged axially intermediate a snap ring 116 fitted on the reduced portion of sleeve 106 and an axial portion of member 108 axially opposite surface 112 serves to maintain the sleeve in conically wedged and held position on the member 108. An angular slot 118 is provided in sleeve 106 adapted to receive the pin 104 therein.

It is to be noted that upon engagement of the pin 104 in slot 118 an upward actuation of the screw element 86 serves to move the ratchet teeth out of engagement as well as to move the sleeve 106 away from frictionally wedged position on member 108. As such no rotation is imparted to the screw element either by reason of the ratchet arrangement between the sleeve 92 and member 88 or the engagement of the pin in slot 118. In the case of a downward movement of the screw element 86 the ratchet teeth are impressed into locking engagement serving to hold sleeve 92 and member 88 together as a unit. This is occasioned by pin 104 engaging a wall of the sleeve 106 adjacent slot 118 exerting an axial thrust to move sleeve 92 relative to screw element 86. Simultaneously therewith the thrust of screw element 88 transmitted through pin 104 to sleeve 106 serves to press sleeve 106 into wedged frictional holding position upon stationary member 108. With sleeve 106 restrained from movement relative to member 108 the slot 118 serves to rotate the sleeve 92 and screw element in a clockwise direction. This clockwise rotation of the screw element likewise as in Fig. 1 will provide for a shortening of an adjustable push rod assembly adapted to be associated therewith.

The structure of Figs. 8 and 9 differs from that of Fig. 1 particularly as regards the provision of means for restraining part of the push rod from rotation and thus inhibit the transmission of any rotative forces, from the tappet engageable with said part, to the threaded portion of the screw element.

The push rod assembly 120 shown by Fig. 8 includes a screw element 122 and a nut element 124 biased apart by a torsion spring 126 having opposite extremities secured upon flanges 128 and 130 arranged respectively on the screw and nut elements. Screw element 122 includes a body portion 132, a threaded portion 134, a cylindrical body portion 136 having flange 128 thereon and a reduced body portion 138 loosely received telescopically in an open end of a tubular member 140 forming a part of the push rod assembly 120. A flat washer 142 is disposed axially between the end extremity 144 of tubular member 140 and an end extremity 146 of cylindrical body portion 136.

A coiled spring member 148 similar to coiled spring member 42 of Fig. 1 is telescopically arranged on body portion 136 axially between the flange 128 and washer 142 and is operative similarly to spring member 42 in relation to the body portion it embraces. A radially extended part 150 is formed on one end of spring member 148.

A second coiled spring member 152 is arranged in telescopic relation to the external periphery tubular member 140 adjacent washer 142 and embraces tubular member 140 with sufficient load so as to restrain relative rotation between said member 152 and the tubular member 140 regardless of the direction of rotation imparted to either the spring member 152 or the tubular member 140. A radially extended part 154 is formed on one axial end of spring member 152 adapted to register in a vertical portion 156 of a slot 158 formed in a flanged plate or member 160 adapted to be fixedly secured to an engine block or other stationary member 162. The part 154 of spring member 152 is received in an angular portion 164 of slot 158.

By so arranging the reduced body portion 138 of screw element 122 in the tubular member 140 relative rotation can occur therebetween and thus inhibit transmission of relative motion from one member to the other or permit independent rotation of said members.

It will be noted in viewing the structure of Figs. 8 and 9 that with the parts 150 and 154, of the respective coiled spring members 148 and 152, arranged in the slot 158, a vertical motion of the push rod assembly, as induced by the rotation of an appropriate cam engaging a tappet, which tappet in turn frictionally engages the axial extremity of tubular member 140 opposite extremity 144 thereof, will cause a rotation of part 150 of spring member 148, whereas part 154 of spring member 152 as received in portion 156 of slot 158 will not be rotated but rather held against rotation. As such with the spring member 148 wound as the spring member of Fig. 1 and with the same threaded relation between the structures of Fig. 8 and Fig. 1, a downward movement of push rod assembly 120 will operate to rotate screw element 122 clockwise serving to shorten the push rod assembly. At the same time tubular member 140 will be held against rotation and relative rotation will take place between the screw element 122 and the tubular member 140 in which it is supported.

The structure of Figs. 10 and 11 differs from the structure of Figs. 8 and 9 merely in the provision of a pin 160 fixedly secured to a tubular member 162 and extending radially outwardly thereof in place of spring member 152 of Fig. 8. Pin 160 is received in vertical portion 165 of a slot 166, formed in a stationary flanged member 168 and slot 166 differs from slot 158 of Fig. 9 in that the pin 160 is disposed axially further away from part 150 of spring member 148 than part 154 of spring member 152. This structure is necessary solely because of the necessity to position pin 160 at a point on tubular member 162 wherein it does not lock or secure the members 162 and 122 together.

The structure of Figs. 10 and 11 operates in the same manner as the structures of Figs. 8 and 9 and it is therefore deemed unnecessary to further explain the operation thereof.

Although the various structures have been disclosed specifically as regards the character of the threads, coiled spring members, and slots in which the coiled spring members are received it is conceivable that variations as to pitch of threads, right or left hand character of said threads, right or left hand winding of the coiled spring members, and the degree and direction of angularity of the slots can be changed without departing from the crux of the invention as basically disclosed in the drawings and defined in the specification. Accordingly, the invention is directed basically to the provision of means engageable with an element of a screw and nut push rod assembly providing for a predetermined rotation or turning thereof in one direction while releasing said element from rotation or turning in an opposite direction and the claims appended thereto define thereof in varying terms.

What I claim is:

1. A valve operating mechanism comprising threadingly engaged screw and nut members, a spring normally biasing said screw and nut members apart, and cam actuated means, for rotating one of said members in only one direction, including a one-way spring clutch member.

2. A valve operating mechanism comprising threadingly engaged screw and nut members, a spring normally biasing the members apart, and one-way friction means engageable with one of said members having one rotative direction clutching and reverse rotative direction releasing relation with said one member.

3. A valve operating mechanism comprising threadingly engaged screw and nut members, a spring normally biasing the members apart, and surface friction engaging means, for rotating one of said members in one direction, having clutch engaging relation with said one member for one direction of rotation thereof and having clutch releasing relation with said one member for the opposite direction of rotation thereof.

4. A valve operating mechanism comprising threadingly engaged screw and nut members, a spring normally biasing the members apart, and means, providing for the rotation of one of said members in one direction upon axial movement of the members in one direction while ineffective to cause reverse rotation of said one member upon an opposite axial movement of the members, including a surface friction engaging spring member.

5. A valve operating mechanism comprising threadingly engaged screw and nut members, a spring normally biasing the members apart, and means, engageable with one of said members for positively rotating said one member in only one direction upon axial movement of said one member, including a cam means, a stationary member and a one-way clutch.

6. A valve operating mechanism comprising threadingly engaged screw and nut members, a spring normally biasing the members apart, one-way clutch means engageable with one of said members, and angularly slotted means engageable with the one-way clutch means effective to rotate the clutch means into clutching engagement with said one member for one axial direction of movement of the members and effective to rotate the clutch means in an opposite direction and release it from clutching engagement with said one member for an opposite axial movement of the members.

7. A valve operating mechanism comprising threadingly engaged screw and nut members, a spring normally biasing the members apart, and means for rotating one of said members in only one direction including a one-way clutch and an angular slotted member.

8. A valve operating mechanism comprising threadingly engaged screw and nut members, a spring normally biasing said members apart, a one-way clutch coiled spring member engageable with an external cylindrical portion of one of said members, and stationary means engageable with a portion of the spring coiled member effective upon axial movement of the screw and nut members in one direction to rotate the spring member in a direction to clutch the spring member to said one member and rotate it simultaneously therewith, and effective upon axial movement of the screw and nut members in an opposite direction to rotate the spring member in a direction to release it from engagement with said one member.

9. A mechanism according to claim 8 wherein the stationary means has an angular slot therein in which the portion of the spring member engageable with the means is received.

10. A mechanism according to claim 9 wherein the screw and nut members in association with one another form a part of a push rod adapted to be engaged on one end by a tappet and on the opposite end by a rocker arm.

11. A valve operating mechanism comprising threadingly engaged screw and nut members, a spring normally biasing the members apart, a member axially engageable with one of said screw and nut members and coaxial and axially reciprocable with the screw and nut members, means for rotating one of the screw and nut members in only one direction, and means for restraining rotation of the third member, including a stationary member.

12. A valve operating mechanism comprising threadingly engaged screw and nut members, a spring normally biasing the members apart, a third member reciprocable with the screw and nut members arranged adjacent one end of one of said screw and nut members, one-way friction cam actuated means engageable with one of said screw and nut members having one rotative direction clutching and reverse rotation direction releasing relation with said one member, and means for inhibiting rotation of said third member.

13. A mechanism according to claim 12 wherein the first means includes an element having one-way clutching engagement with said one member and an angularly slotted stationary member engageable with a portion of the element.

14. A mechanism according to claim 13 wherein the second means includes an element secured to the third member and a portion of the element of the second means is restrained to movement in a vertical path.

15. A mechanism according to claim 14 wherein the stationary member has a vertical slot as a continuation of the angular slot and wherein the element of the third member has a portion received and confined to vertical movement therein.

16. A valve operating mechanism according to claim 14 wherein the first element is a coiled spring one-way clutch and the second element is a coiled spring frictionally secured to the third member.

17. A valve operating mechanism according to claim 14 wherein the first element is a coiled spring one-way clutch and the second element is a pin fixedly secured to and extending radially outwardly therefrom.

18. A valve operating mechanism comprising threadingly engaged screw and nut members apart, a spring normally biasing the members apart, a third member coaxial with the screw and nut members reciprocable along the axis of the screw and nut members disposed adjacent the end of one of said screw and nut members, means providing for the rotation of one of said engaged members in one direction upon axial movement of the members in one direction while ineffective to provide for reverse rotation of said one member upon an opposite axial movement of the members, and means, for inhibiting rotation of the third member upon axial movement of the members in either direction including a part reciprocable with the third member.

19. A mechanism according to claim 18 including a rocker arm engageable with one end of the one of said screw and nut members which is not rotated by the first means, a rotatable cam, and a tappet engaged by the cam, wherein the third member is engageable with the tappet oppositely disposed from the cam and wherein the members constitute the push rod of the mechanism.

20. A valve operating mechanism comprising threadingly engaged screw and nut members, a spring normally biasing the members apart, a rotatable sleeve having an angular slot therein, one-way brake means for inhibiting rotation of the sleeve in one direction, and means connected with one of said members slidably engageable in the angular slot in the sleeve.

References Cited in the file of this patent

UNITED STATES PATENTS

| | | |
|---|---|---|
| 1,820,891 | Spiller | Aug. 25, 1931 |
| 1,930,261 | Berry | Oct. 10, 1933 |
| 2,624,324 | Russell | Jan. 6, 1953 |
| 2,630,792 | Engemann | Mar. 10, 1953 |